May 9, 1933.   K. MORSBACH ET AL   1,908,043
OPTICAL PROJECTION SYSTEM
Filed Jan. 23, 1931
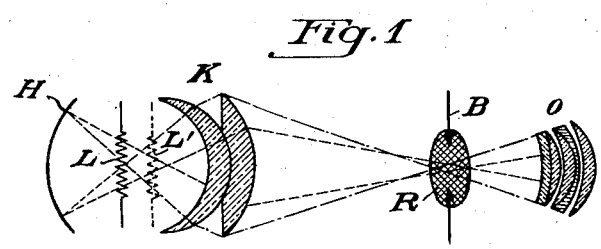
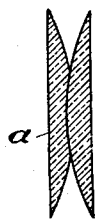 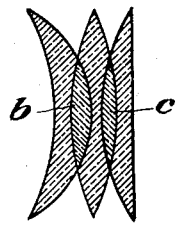 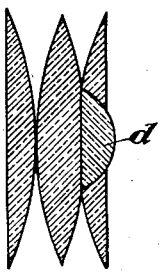
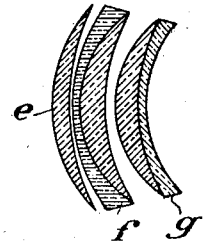
Inventors:
Kurt Morsbach
Hans Schulz
by Lotka & Kehlenbeck
Attorneys.

Patented May 9, 1933

1,908,043

UNITED STATES PATENT OFFICE

KURT MORSBACH, OF BERLIN-GRUNEWALD, AND HANS SCHULZ, OF BERLIN-LICHTER-FELDE-OST, GERMANY, ASSIGNORS TO PROJECTOR, G. M. B. H., OF BERLIN GERMANY, A CORPORATION OF GERMANY

OPTICAL PROJECTION SYSTEM

Application filed January 23, 1931, Serial No. 510,640, and in Germany February 7, 1930.

Our invention relates to optical projection systems for motion picture purposes.

The object of our invention is to provide an optical projection system which enables a considerably better utilization of the source of light than was possible with the systems used heretofore.

In the known systems, whether used in simple picture projectors or motion picture apparatus, the source of light, which must be assumed as a flat surface, was preferably produced within the projection objective or in the immediate vicinity thereof, in order to obtain a uniform illumination of the projection surface, i. e., to render ineffective the more or less sharp image of the source of light produced by the condenser.

This general rule is clearly stated in all previous descriptions of such apparatus in the technical literature, as shown in the following publications:

(1.) Lax und Pirani, "Lichttechnik auf physikalischer Grundlage", Berlin 1928, page 413, Figure 18, (2.) Sonnefeld, "Die Hohlspiegel", Berlin 1926, page 92, (3.) H. Joachim, "Die neueren Fortschritte der Kinomatografie", Leipzig 1921, pages 33 and 34, Figures 32 and 33, and (4.) Forch, "Der Kinomatograf und das sich bewegende Bild", page 156, Figure 107.

Observance of this rule is, however, under special assumptions, not absolutely necessary, as can also be gathered from the most recent literature.

It has been shown that a prefectly uniform illumination of the projection surface may be obtained even when the image of the source of light is not, as preferably done heretofore, produced within or closely in front of the objective, but at a somewhat greater distance from the objective whereby the advantage is obtained of a greater surface brightness with the same source of light. The assumption in this case is that the source of light, as such, radiates its light fairly uniformly over its entire surface, as otherwise any irregularities would become noticeable by the reproduction in the picture field. Such an arrangement is no longer possible even when using mirrors as light collecting systems, if the surfaces of the source of light, as for instance filament lamps, possess light and dark zones.

The idea of our invention is based on the absolutely necessity equalization of the irregularities in brightness in the picture field, which are unavoidable when forming the image of the luminous body in the picture aperture or film window, as long as an attempt is made as heretofore, to make the reproduction faults of the condenser as small as possible; this has also been expressed in recent patents relating to the construction of condensers with nonspherical surfaces, see German Patent No. 393,652, Bielecke, or United States Patent 1,716,361.

In contrast therewith the reproduction faults of the condenser, the object of which according to our invention is by no means a sharp reproduction but only a regulation of the light, are not eliminated but are even intentionally increased so that in this way instead of a sharply outlined image of the luminous surface, points of the image are transmitted by the various zones of the condenser substantially uniformly over an extensive space, whereby the irregularities of the luminous surface (image of the luminous filaments) become ineffective. This luminous space is according to our invention placed in the vicinity of the plane of the object (aperture plate), or arranged in such a manner that it is located partly in front of and partly behind this object plane.

In this case the object may now optionally be considered as self-luminous so that the objective is not only used to produce a picture according to the assumptions upon which the calculation is based but also produced the maximum output as regards light. The object thus functions in the same way as a photographic objective, which means to say, that all the zones are made use of for the production of the picture and that the aperture ratio of the objective determined by calculation becomes the controlling factor for the output of the projection system as regards light. The objective may according to our invention be designed for a particularly great light intensity, in a manner more fully described hereafter.

In apparatus as disclosed heretofore the individual zones of the objective are made use of in a perfectly irregular way, and a large portion of rays of light which have already reached the objective are furthermore lost on the internal screens or diaphragms or the walls of the frames of the lenses, as the angles of incidence of these rays of light are different from those provided for in the image calculation of the objective. It will thus be clearly understood that, on the one hand, in earlier constructions the capacity of the objective as regards light intensity was bound to lie below the calculated value of its aperture ratio, and that, on the other hand, any zone faults existing would be liable to show up strongly. That this idea has not hitherto been recognized follows from the technical literature, particularly from the work of Sonnefeld, page 91, in which the difference in the action of the various forms of objectives has been expressly pointed out, without any rule being laid down for the application of the various types of objectives. Only by the broad idea underlying our invention has this difference been established as a clear law.

The zone-differentiated image of the source of light described is obtained by a condenser system constructed in a special manner. It is obvious that when using the usual condensers due to the intentionally made correction the still existing slight indistinctness is not sufficient to obtain a uniform illumination when the image of the source of light is located outside the objective. Thus arises the necessity to design the condenser systems required for our invention in such a manner that the spherical abberration of the edge zones is considerably increased, preferably in such a way that the spherical longitudinal aberration amounts to at least one quarter of the diagonal diameter of the aperture in the aperture plate, which diameter is the diameter of the circle circumscribed to said aperture. This may, on the one hand, be effected by increasing the aperture ratio generally, and on the other hand by a special design of the refracting surfaces in known manner.

In the drawing annexed to our specification and forming part thereof several embodiments of our invention are illustrated by way of example.

In the drawing:

Fig. 1 shows our improved projection system in diagram,

Figs. 2 to 4 illustrate three different constructions of the improved condenser, and Fig. 5 is a diagrammatic sectional view showing, upon an enlarged scale the objective appearing at the right of Fig. 1.

Referring to Fig. 1 of the drawing showing a diagram of the projection system, L indicates the source of light, K the condenser, B the picture plate having the aperture or film aperture, and O the objective. By means of the intentionally increased spherical faults of the condenser, the production of a flat image of the luminous surface L by the condenser K is avoided and the points of the image are by the individual zones shifted into the space R. It will be noted that this space is not simply a surface area located in a plane, but is a three-dimensional space, or, as it were, an imaginary solid.

Should it by this provision be impossible to attain the amount of deviations necessary for the uniformity of the illumination, spherical surfaces in a negatively correcting sense may be introduced or the individual lenses of the condenser system may be curved.

It is, furthermore by the increase of the effective aperture possible to attain a reduction of the condenser diameter and its focal distance, so that the entire illumination system may be given smaller dimensions in comparison with known forms of constructions.

A calculation carried out on the basis of the known constructions showed, for instance, that with a reduction of the film picture, that is in passing from the standard film to the narrow film, either the focal distance of the condenser may be reduced, or that with the focal distance of the condenser the distance of the film aperture from the condenser must be increased until it reaches the focal plane of the objective shortened in its focal distance for narrow films. In contrast herewith it can also on the basis of hitherto known laws be satisfactorily proved, that with the construction of the projection system according to our invention, the aperture of the condenser on the side of the picture may even be made larger than that of the objective. When, however, the useful aperture of the condenser can be increased to such an extent, the logical conclusion is that an increase of the illuminating effect of the entire system will take place, which can also be proved by experiments.

If, up to now, it was impossible to obtain an increase of the inlet aperture of the condenser, this must be accounted for on the one hand by the size of the radii determined by the desired correction of the condenser, and on the other hand by the mechanical impossibility of bringing the source of light close enough up to the principal plane of the condenser at the side of the lamp.

These difficulties may according to our invention be eliminated, by taking into consideration the energy distribution in the pencil of rays taken up by the source of light and intentionally dispensing with the cooperation of the less active central zones. Then, by a corresponding adaptation to the curvature of the nearest lenses of the condenser system, the central thickness of the lens may be reduced, and thus the aperture enlarged. This is attained either by grinding out the central portions of the condenser lenses, or by replacing parts of the condenser by more highly refracting material for the purpose of reducing the focal length.

In Figures 2 to 4 of the drawing we have illustrated three suitable forms of construction of our improved condenser.

Fig. 2 shows the case in which a reduction of the central thickness has been obtained by grinding out of the front lens $a$. The size of the central zone without focal length in this case may be determined by simple calculation. If, for instance, it is possible with a condenser the original aperture of which was 30° to increase the useful aperture angle on the light side to 35° by moving the lenses closely together in the manner described, it is found that a central zone of about 18° on both sides of the axis may be cut out without loss of light. As this light passes at least partly through the picture aperture or plate aperture to the objective, it is proved thereby that the shortening of the focal length brought about by the reduction in the thickness of the lenses ensures a better utilization of the light by the use of the condenser.

The forms of constructions shown in Figs. 3 and 4 clearly show the possibility of introducing lenses of more strongly refracting material in the central zone. The radii may be either chosen to correspond with those of the condenser lenses proper, as shown in Fig. 3 at the lenses $b$ and $c$, or they may be arbitrarily chosen to a certain extent, as shown by the lens $d$ in Fig. 4, in order to attain a suitable convergence of the centre rays.

A still more favorable utilization of the source of light is obtained if a concave mirror H is, in a manner well-known by itself, added to the condenser located between the picture aperture or film window and the source of light, according to Fig. 1, which mirror collects the rays emanating from the source of light L in the opposite direction and reflects them into the condenser system K. In addition to the increase in the output of light attained, the distribution in space of the image points of the source of light necessary according to the idea underlying our invention, may also be influenced by the mirror, since the image L' of the source of light L produced by the mirror $h$ is not shifted into the plane of the luminous filaments, but into the space between the luminous filament L and the condenser K or between the luminous filament L and the mirror H. According to our invention the mirror serves primarily for the distribution of light in addition to intensifying the light.

A form of the optical illumination system, as above described, is particularly suitable when employing objectives of great intensity of light. The hitherto known objectives have a maximum relative aperture ratio of 2:1 so that a larger aperture on the picture side of the condenser could not be utilized at all. If with the existing forms of objectives of projecting systems the intensity of the light can be more than doubled by our invention, as can be proved by experiment, the increase of the picture side aperture of the condenser possible according to our invention, that is the extensive illumination of the picture aperture, which may thus be regarded as self-illuminating, naturally leads to the demand for objectives of still greater light intensity so that all the light emanating from the picture aperture made self lighting may also be taken up to the full extent by the objective. This possibility arises when the extent of the luminous space sphere, which as above described may in its longitudinal extension become at least ¼ of the diagonal diameter of the aperture in the aperture plate B or even larger, stands in a definite relation to the relative aperture ratio of the objective. If, for instance, the relative aperture of the objective becomes very small, the edge rays of the illuminating device do no longer cooperate and the equalization of the brightness of the various parts of the source of light does not occur unless the spherical longitudinal aberration is adapted to the relative aperture ratio of the objective. This adaptation is particularly advantageous if the product of the quotient of the spherical longitudinal aberration and the diagonal diameter of the picture aperture with the relative aperture ratio attains or exceeds the value ½.

In the manufacture of objectives of high light intensities two essential conditions must be fulfilled, inasmuch on the one hand the curvatures of the lenses depend upon the necessary linear objective aperture, and on the other hand the sum of the centre thicknesses from the focal length of the objective.

The usual double anastigmats run counter to the first condition, while the systems of lenses to be derived from the Cooke lens such as the Heliar or similar constructions do not comply with the second condition, and furthermore require too great a lens spacing for the aperture ratio of 2:1 and also for forms of greater light intensities.

It is possible to comply with both conditions if the system is built up of a simple converging lens on the image side and a correspondingly corrected additional system likewise of collecting character in its aggregate action, the collecting action of the first lens amounting to a considerable fraction of the total refracting power. That this is possible could not be anticipated, as such a simple lens at an aperture ratio of the order of 1:4 to 1:6 naturally shows very considerable image faults. It has, however, been ascertained that such a correction may be carried out without any great trouble. The distance of the simple lens from the correcting additional system may even be altered within such limits that by this alteration a by no means inconsiderable change of the total refracting power is attained which could, of course, not be attained in the event of too weak an action of the simple lens.

In such a system the correcting constituent on the object side is preferably composed of two or more single systems. One system should carry out the correcting action, while the others are approximately corrected in themselves and can be added or removed for the purpose of changing the focal length without influencing the state of correction. In principle such arrangements are already known in projecting systems. It is known that a certain interchangeability of the partial systems is possible in microscope objectives. While, however, in the said systems simple lenses are exclusively employed on the object side, the simple lens is in the above described systems located on the picture side. A displacement of this lens has a substantially smaller and practically hardly noticeable influence upon the state of correction. The almost semi-spherical front lens usual in microscope systems, which assuming correct adjustment gives aberrationless pictures, is useless for the purposes of our invention because the smallest displacement is bound to produce a strong change of the correction.

As the spherical and chromatic faults of a non-compound or simple lens depends upon the curvature and the material of the lens, it is, in a system carried out according to the idea of our invention, possible to replace the simple lens on the side of the picture by a lens of different focal length which has substantially the same image faults. As is shown diagrammatically in Figure 5, by way of example, the first lens $e$ turned towards the projection surface or screen thus is a simple positive lens, the focal length of which should be less than four times the focal length of the whole objective. The following part of the projection objective may consist of one or more pairs of converging lenses $f$ and $g$, it being a condition that the part of the objective consisting of a simple front lens $e$ and following compound system $f$ be corrected spherically and as regards the sine. The chromatic correction is attained by the lens combination mentioned. The third preferably compound system $g$ serves, on the one hand, for changing the focal length of the total system and, on the other hand, for compensating the faults in the event of higher demands as regards sharpness of the pictures and size of the object to be represented. The separation into a simple front lens $e$ followed by correcting systems $f$ and $g$ has the advantage that, as pointed out, by the changing the spacing of the system the sharp adjustment, which is difficult in case of short focal lengths, is facilitated because a longer path of adjustment is attained hereby. This arrangement also offers the possibility to exchange the front lens $e$, for the purpose of varying the focal length, in the same way as already known in the systems of photographic cameras. The third part $g$ of the system may likewise be adapted to slide and permits, on the one hand, an alteration of the focal length or the attainment of a desired enlargement ratio with the same distance of projection.

In conclusion, it must be pointed out that in the systems known heretofore, for photographic or projection purposes, the adjustment of the lenses has already been used merely for the purpose of altering the state of correction. As example may be mentioned the micro objectives equipped with correction holders and the Helier provided with adjustable negative lens, in which an indistinct (blurred) image is to be obtained.

We claim as our invention:

1. In an optical projection system, a source of light of uneven surface brightness, an optical illuminating device in the path of the rays of light proceeding from said source, an object illuminated by the light coming from said device, the latter consisting of a condenser having spherical longitudinal aberration, said spherical aberration being greater than one-fourth of the diameter of the circle circumscribing said object, and an objective located in the path of the light coming from said object, the product obtained by multiplying the relative aperture ratio of said objective by the quotient of said longitudinal aberration divided by the maximum diameter of the object, amounting at least to $\frac{1}{2}$.

2. In an optical projection system, a source of light of uneven surface brightness, an optical illuminating device in the path of the rays of light proceeding from said source, an object illuminated by the light coming from said device, the latter consisting of a condenser having a spherical longitudinal aberration greater than one-fourth of the diameter of the circle circumscribing said object, said condenser being composed of lenses at least one of which has a ground-out central surface engaged by the adjacent portion of another lens of said condenser so as to alter the optical effect of the central zone of the condenser.

3. A projection system according to claim 2, in which the lens engaging the ground-out central surface is of strongly convergent refracting character.

In testimony whereof we affix our signatures.

KURT MORSBACH.
HANS SCHULZ.